United States Patent [19]

Gabrielson et al.

[11] 4,123,122

[45] Oct. 31, 1978

[54] BEARING ELEMENT

[75] Inventors: Alan L. Gabrielson, Bristol; Harry Magazian, Monroe, both of Conn.

[73] Assignee: The Torrington Company, Torrington, Conn.

[21] Appl. No.: 702,953

[22] Filed: Jul. 6, 1976

[51] Int. Cl.$^2$ ............................................. F16C 32/00
[52] U.S. Cl. ........................... 308/238; 308/DIG. 5; 308/DIG. 8
[58] Field of Search .......... 308/238, DIG. 5, DIG. 8, 308/DIG. 7, DIG. 9

[56] References Cited

U.S. PATENT DOCUMENTS 3,206,264  9/1965  Dalzell et al. .................. 308/DIG. 8
3,266,123  8/1966  McCloskey .................... 308/DIG. 7

Primary Examiner—Richard A. Bertsch
Attorney, Agent, or Firm—Frank S. Troidl

[57] ABSTRACT

A rough and porous coating is applied by spraying and metallurgically bonding to a bearing member. The coating is preferably of a strong and thermally conductive material, such as aluminum-bronze, with the coating having interstices, such as cavities, undercuts, and craters to provide a porous material. An adhesive-solid lubricant formulation is then applied to the coating. The adhesive-solid lubricant formulation fills the coating interstices. The adhesive-solid lubricant formulation is cured for the required time at the required temperature to form a low-friction bearing surface layer.

12 Claims, 4 Drawing Figures

BEARING ELEMENT

This invention relates to bearings. More particularly, this invention is a new and novel bearing element having a low-friction slide surface.

Many different types of self-lubricating bearings are currently in use. Some of these self-lubricating bearings have low-friction liners, separately attached. The liner may include a woven cloth having at least its slide surface formed predominently, if not entirely of threads of polytetrafluoroethylene. The cloth is embedded in and bonded to the bearing substrate by hard resin which penetrates the interstices of the cloth and which serves as a matrix. An example of a self-lubricating bearing, including a liner, is disclosed in U.S. Pat. No. 3,582,166 granted June 1, 1971 to Paul J. Reising and entitled "Bearing Having Low-Friction Fibrous Surface and Method For Making Same." This bearing has a linear prefabricated with long strands of low-friction fibers embedded in a thermosetting resin and bonded to a cloth by the resin, with the strands all parallel to the liner surface and in non-interlocking relationship to each other.

In U.S. Pat. No. 3,155,439 patented Nov. 3, 1964 in the name of Edmund A. Guzewicz, and entitled "Antifriction Bearings and Method of Construction Same" an antifriction bearing is disclosed which does not have a separate liner bonded in, but instead includes a graphite dry lubricant in a bronze metal matrix with powders of the two materials sprayed together onto the substrate with the bronze fusing to the substrate and holding the otherwise free graphite particles. The bronze disclosed in said U.S. Pat. No. 3,155,439 is composed of soft metals which we usually associate as being in bronze; namely, copper, tin, and zinc.

Previous dry-lubricant bearings have suffered one or more of a variety of deficiencies, among which are: poor bearing load capacity, low strength of the lubricant layer with poor resistance to flow under load, comparatively low strength of the substrate, poor heat conductivity from the sliding surface, poor adhesion of the lubricant layer to the substrate, poor heat resistance of the bearing components, the requirement for an accurately machined and precision finished bearing substrate.

Our invention overcomes many of these deficiencies in a novel and efficient manner in a single unit. We provide a high-strength hardened bearing substrate with a low-friction layer mechanically held as well as chemically bonded to it in such a way as to provide high bearing load capacity with good resistance to the extruding of the low-friction lubricant layer out of the bearing under high bearing loads and with capacity for good heat transfer from the bearing slide surface. The solid lubricant eliminates the need for fluid or grease lubrication.

This invention is not in the nature of a prefabricated liner material which is subsequently attached to a bearing surface. Instead of using the conventional fabric or wire mesh in the structure to strengthen an adhesive resin film containing lubricants, this invention uses a metallurgically spray bonded coating which preferably will be made of a high strength, high thermal conductive metal, such as aluminumbronze. The coating provides a multiplicity of random closely spaced craters or surface voids and subsurface undercuts and passageways which are at least partially but preferably totally filled with an adhesive-solid lubricant formulation, including a solid lubricant embedded in the adhesive. In some cases, as for example with polyimide resin which itself has a low coefficient of friction, this adhesive resin alone may act as the solid lubricant without the addition of other solid lubricants. The surrounding multitudinous asperities of the metal deposit then create a containing and reinforcing and strengthening mechanism which combines with chemical adhesion to inhibit the natural tendency of the adhesive film to flow under the pressure of high applied loads. The coating is superior to the fabric or wire mesh structure in that it provides many times the number of "pegs" or obstructions to flow of the adhesive. Any cracking or loosening of the high strength and high hardness resin adhesives, results in our bearing only in many small particles of lubricant containing resin separated from one another by cracks, but still chemically bonded to their local asperities and/or mechanically contained by the local cavities and undercuts in the coating. Also, loss of individual very tiny pieces of the lubricant-adhesive is possible without the adjacent tiny pieces being displaced. Load carrying and lubricating capabilities of our bearing are relatively unchanged by this. In well known bearings with low friction liners, often a crack continues propagating until the whole liner or sections of it will loosen and possibly get out of position under the changing loads, and the plastic movement of the bonding agent or of the material in the liner, itself.

Our porous coating, when composed of a high strength lubricating bearing metal with good heat transfer qualities such as aluminum-bronze, for example, may extend all the way from the bearing substrate to the bearing slide surface. This will provide the best heat transfer capability possible with our bearing, and under conditions of high heat generation with provide the longest life when used in conjunction with the lubricant-containing adhesive resin. Under less rigorous heat generating or bearing loading conditions, our lubricant-adhesive layer may completely cover the coating, resulting in less friction at the sliding surface. Where high strength is more important than heat transfer, as in a high load lowspeed bearing application, a porous steel coating, for example, may be used to hold the lubricant-adhesive material. Where extremely high ambient temperatures will be encountered, a porous ceramic coating such as aluminum oxide may be metallurgically spray bonded to form the coating. Thus our process can be tailored to suit the anticipated operating conditions of the bearing by spray-bonding different porous coatings onto the substrate to support the lubricant-adhesive formulation. We will also select the proper lubricant to be mixed with the proper thermosetting adhesive resin to complete the bearing. If desirable for a particular application, we can spray-bond one porous coating over another, for example a layer of aluminum-bronze or phosphor-bronze over a layer of steel.

The aluminum-bronze is an alloy consisting of copper and aluminum with or without some additional material. Aluminum-bronze usually has a little iron. A particularly good aluminum-bronze mixture for use with this invention would include 9.5 percent aluminum, 89.5 percent copper, and 1 percent iron. The type of bronze disclosed in U.S. Pat. No. 3,155,439 being comprised of a combination of copper, tin and zinc is much softer and less strong than the aluminumbronze shown in one embodiment of this invention; and therefore, is limited in its ability to carry high loads.

Briefly described, this invention is a bearing element having a low-friction slide surface comprising a metallurgically spray-bonded porous and rough coating on a bearing substrate. The coating is formed by metallurgical spraybonding metallic or ceramic material onto the substrate with the resulting particles bonding to the substrate and to each other. This coating has interstices, cavities, craters, voids and undercuts. An adhesive-solid lubricant formulation, including solid lubricant embedded in a resin adhesive, is interlocked with the porous coating. The adhesive-solid lubricant totally or partially fills the craters, cavities, interstices, and undercuts in the coating. Preferably, the voids are totally filled.

Our new method of making a bearing element comprises the steps of metallurgically spray-bonding a material, such as for example aluminum-bronze, to a substrate such as a steel bearing member, so that the material particles metallurgically bond to the bearing substrate and to each other, and form a rough and porous coating. Our process allows us to use a previously fully-hardened bearing substrate, which many other processes do not allow. A resin adhesive-solid lubricant formulation is then applied to the coating material layer so that at least a portion of the adhesive-solid lubricant totally or partially fills the metal interstices. It may or may not, as desired, form a complete lubricantadhesive film over the coating layer. The material is then cured under heat or under heat and pressure for the required time and at the required temperature.

The invention, as well as its many advantages, may be further understood by reference to the following detailed description and drawings in which.

In the various figures, like parts are referred to by like numbers.

Figure 1:
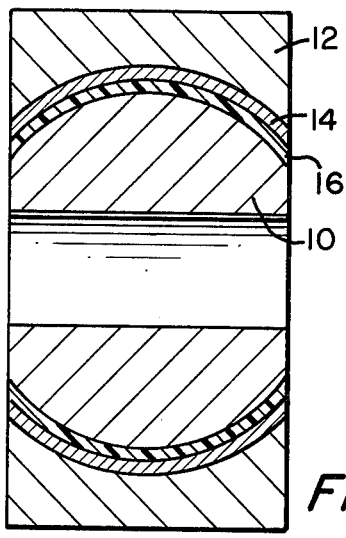
FIG. 1 is a sectional view of a spherical or selfaligning type bearing embodying the invention.

Referring to the figures, and more particularly to FIG. 1, the bearing shown comprises a truncated bored metal ball member 10 and an outer annular metal race 12. The inside surface of the annular metal race 12 has the metallurgically spray-bonded coating 14, which may consist entirely or substantially of an aluminum-bronze metal. The adhesivesolid lubricant mixture applied to the coating layer is identified by the number 16.

In FIG. 1, the coating layer 14 and the adhesive-solid lubricant layer 16 are shown somewhat exaggerated for clarity. The coating thickness may range from 0.001 inches to 0.015 inch thick, with the lubricant-adhesive thickness ranging up to 0.020 inch above the surface of the coating. Our preferred coating layer is from 0.002 inch thick to 0.003 inch thick with the adhesive solid lubricant layer extending about 0.005 inch to 0.006 inch above the coating layer. Also, though FIG. 1 may indicate otherwise, there is no clearly defined boundary between the coating layer 14 and the adhesive-solid lubricant layer 16 as will be explained herein. The large heat transfer surface area of the coating asperities assist greatly in transferring heat away from the lubricant adhesive layer, even when the coating asperities do not penetrate all the way through to the slide surface, as compared to heat transfer from the lubricant adhesive layer to a comparatively smooth substrate with its relatively smaller heat transfer surface area.

Figure 2:
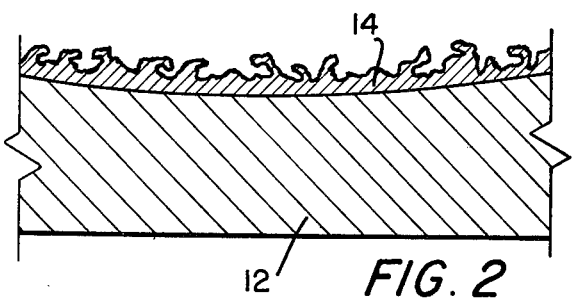
FIG. 2 is an enlarged, fragmentary view showing the powdered metal deposited on the outer member of the bearing.

FIG. 2 is a sketch illustrating what was seen in an actual photograph magnified twenty times. FIG. 2 shows the cavities, undercuts, and craters appearing in the coating material after the metallurgical material 14 has been applied to the metal annular race 12.

The coating material is applied to the substrate or annular race 12 by metallurgical spray-bonding. Our preferred method of applying the coating material to the substrate surface is to plasma spray the material onto the substrate surface. A flame spray (sometimes called spray weld) D-gun and Gator gun are three variations of the process that can be utilized to deposit the metallurgical coating material. The terms flame gun and spray weld have been used on variations of the process. The coating and the lubricant-adhesive may be applied to cylindrical, spherical, flat plane, or any surface where sliding loads are transmitted through a conforming surface. For example, while we have shown the coating on the spherical interior surface of the bearing race, we can also coat the exterior spherical surface of the ball or the cylindrical inner surface of the ball. The substrate or outer annular member 12 may be any material so long as the coating material metallurgically adheres to it and the substrate does not harmfully plastically deform under the loads imposed by the specific bearing application. Our preferred substrate material is hardened steel. Porous substrates may be sprayed as well as solid substrates.

Figure 3:
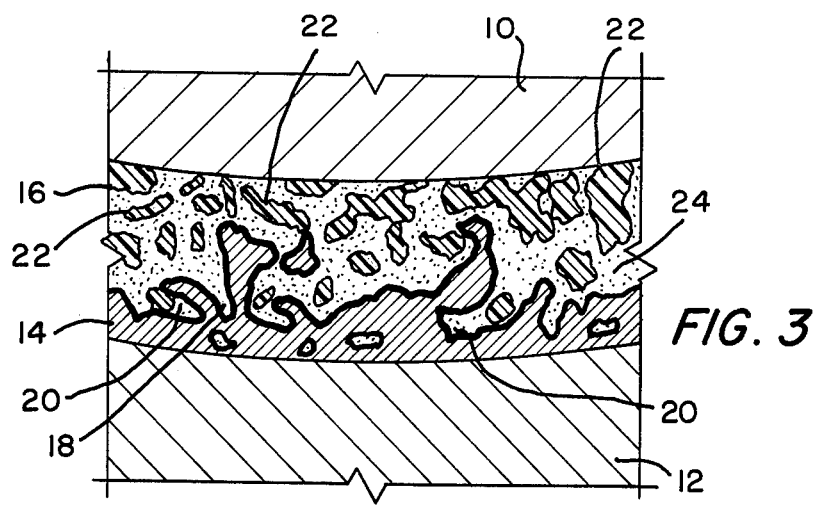
FIG. 3 is a still further enlarged fragmentary view illustrating the manner in which the adhesive-solid lubricant formulation fills the pores, craters, and undercuts of the porous coating.

FIG. 3 is a sketch drawn from looking at a typical cross section multiplied many times. The highly enlarged view illustrates the interlocking arrangement of the coating 14 and the adhesive-solid lubricant formulation 16, after curing. Notice that there are many cavities or depressions, such as depressions 18 in the coating 14, and many undercuts such as undercuts 20. Many of the voids are interconnected beneath the bonded particles. The preferred adhesive is a phenolic adhesive and the preferred solid lubricant is a polytetrafluorethylene fiber known as TEFLON flock (Du Pont) The TEFLON flock or fibers 22 are embedded in the phenolic adhesive 24. Notice that the adhesive 24 with the TEFLON flock 22 embedded therein fills the craters and undercuts of the coating material. The fibers 22 are randomly intermixed in the adhesive 24, although they could be placed parallel to the bearing surface after the adhesive is applied if so desired. The fibers 22 are very, very small and in general are only about 1/64 inch in length. Preferably, the fibers will be less than ⅛ inch in length. The phenolic adhesive may range from 40 percent to 90 percent by weight of the adhesivesolid lubricant mixture; and the TEFLON fibers may range from 10 percent to 60 percent by weight of the adhesivesolid lubricant mixture. A preferred formula consists of 70 percent phenolic adhesive and 30 percent TEFLON fibers by weight. A typical cure time and temperature is one hour at 375° F.

For certain uses of the bearing, a polyamide-imide resin may be substituted for the phenolic adhesive. Another suitable adhesive for the adhesive-solid lubricant mixture may consist on an epoxy resin. The percentage ranges of these adhesives and the lubricants would be the same as for the phenolic lubricant combination. A polyimide or a polyamideimide may also be used in the same proportions, while in some cases the polyimide type adhesive may be used without additional lubricants.

In any of the above formulation, up to 20 percent by weight of additional ingredients may be added to improve the formulation for particular bearing applications, such as in high temperature, low temperature and high load applications. These additional ingredients may for example include KEVLAR fibers (Du Pont) or carbon fibers.

For certain bearing uses, other solid lubricants may be used or a combination of solid lubricant materials may be introduced into the uncured adhesive in various proportions. For example, graphite fibers may be used instead of the TEFLON fibers or a combination of the graphite fibers with the TEFLON fibers. Also, $MoS_2$ powder or TEFLON powder or graphite powder may be used alone or mixed with other solid lubricant powders, or with lubricating fibers in the resin adhesive.

The formulation may be applied to the coating layer material by brushing, roller coating, spraying, dipping or any other means that would result in depositing a lubricant adhesive layer which will at least partially and preferably fully, fill the voids in the coating and form a low-friction surface. Thicker coatings may be obtained by repetitive applications of the mixture where required, possibly with a partial cure between applications.

Figure 4:
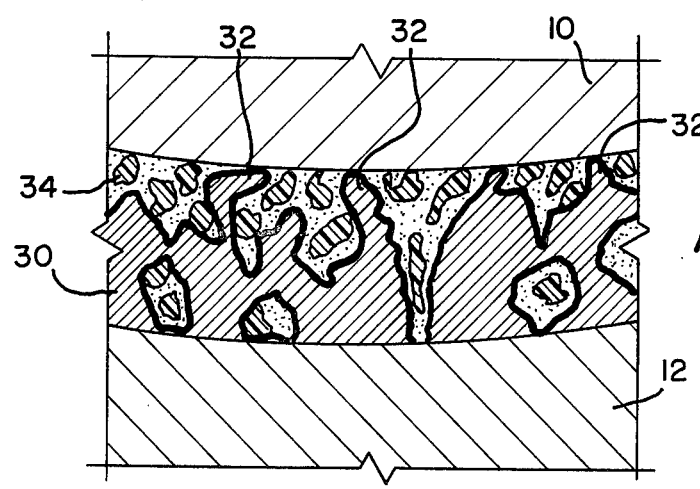
FIG. 4 is a view similar to FIG. 3 showing a modified embodiment of the invention.

For some applications of the bearings, it may be desirable to have a porous coating layer which is thick enough to extend all the way from the annular race 12 to the metal ball member 10. This would be the case, for example, where there is so much heat generation at the sliding surface that unless dissipated, the bearing temperature would be raised high enough to harm the bearing and significantly shorten the bearing life. The excellent heat conduction capability of the aluminum-bronze will conduct the heat away and keep the operating temperature down for prospective longer bearing life. Also, the aluminum-bronze itself is a fairly good bearing material, with high strength as compared to other slide bearing materials. Such an arrangement is illustrated in FIG. 4. As shown in FIG. 4, an aluminumbronze material 30 has portions thereof, such as portions 32 which are in contact with the inner member 10 of the bearing. As can be seen in FIG. 4, the solid lubricant material 34 embedded in the adhesive 36 to form an adhesive-solid lubricant formulation fills the craters, interstices, and undercuts in the aluminum-bronze layer.

In the embodiment shown in FIG. 4, the aluminumbronze containing the adhesive-solid lubricant formulation may be frin 0.002 inch to 0.020 inch thick, with a preferred thickness from 0.006 inch to 0.008 inch. Obviously, other coating materials also may extend from the bearing substrate to the slide surface. One such material might be for example, steel, which will support a much higher load than the aluminum-bronze, although the coefficient of friction against the mating bearing member will be higher. The steel will conduct away heat better than the lubricant-adhesive but not as well as the aluminumbronze.

In practicing the new method of manufacturing a bearing element, the porous layer is first applied to the annular member or substrate 12. Thereafter, the adhesive-solid lubricant formulation is applied to the porous layer. The final step is to cure the materials for the required time and temperature. The actual time and temperature required will vary according to the particular materials used.

We claim:

1. A bearing element consisting of a bearing substrate having a low-friction slide surface layer, said layer comprising: a porous coating metallurgically spray-bonded to the substrate surface, and having interstices, such as craters and undercuts, and an adhesive-solid lubricant formulation applied over the coating, at least a portion of the adhesive-solid lubricant formulation at least partially filling the coating interstices.

2. A bearing element in accordance with claim 1 wherein the solid lubricant is polytetrafluorethylene.

3. A bearing element in accordance with claim 1 wherein the adhesive is a thermosetting phenolic resin.

4. A bearing element in accordance with claim 1 wherein the adhesive-solid lubricant formulation consists of polytetrafluorethylene fibers embedded in thermosetting phenolic resin.

5. A bearing element in accordance with claim 1 wherein the adhesive-solid lubricant formulation only partially fills the coating interstices.

6. A bearing element in accordance with claim 1 wherein the adhesive-solid lubricant formulation completely covers the porous coating.

7. A bearing element in accordance with claim 1 wherein the metallurgically spray-bonded coating is a metal.

8. A bearing element in accordance with claim 1 wherein the metallurgically spray-bonded coating is a ceramic.

9. A bearing element in accordance with claim 1 wherein the metallurgically spray-bonded coating is aluminumbronze.

10. A bearing comprising two bearing elements having surfaces in mating slidable engagement with each other, the surface of at least one of said elements comprising: a rough and porous coating metallurgically spray-bonded on said surface and having interstices; and an adhesive-solid lubricant formulation applied over the coating, at least a portion of the adhesive-solid lubricant formulation at least partially filling the coating interstices.

11. A bearing in accordance with claim 10 wherein the adhesive-solid lubricant formulation completely covers the coating.

12. A bearing in accordance with claim 10 wherein the solid lubricant consists of polytetrafluorethylene fibers.

* * * * *